US011269517B2

(12) United States Patent
Jayaraman et al.

(10) Patent No.: US 11,269,517 B2
(45) Date of Patent: Mar. 8, 2022

(54) COST-AWARE STORAGE ALLOCATION OF DEDUPLICATED OBJECTS

(71) Applicant: Hewlett Packard Enterprise Development LP, Houston, TX (US)

(72) Inventors: Aswin Jayaraman, Bangalore Karnataka (IN); Sijesh Thondapilly Balakrishnan, Bangalore Karnataka (IN); Sankar Ramasamy, Bangalore Karnataka (IN); Naveen Kumar Selvarajan, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/857,300

(22) Filed: Apr. 24, 2020

(65) Prior Publication Data
US 2020/0341650 A1    Oct. 29, 2020

(30) Foreign Application Priority Data

Apr. 26, 2019   (IN) .............................. 201941016750

(51) Int. Cl.
*G06F 3/06*    (2006.01)

(52) U.S. Cl.
CPC .......... *G06F 3/0608* (2013.01); *G06F 3/0607* (2013.01); *G06F 3/0631* (2013.01); *G06F 3/0641* (2013.01); *G06F 3/0647* (2013.01); *G06F 3/0653* (2013.01); *G06F 3/0683* (2013.01)

(58) Field of Classification Search
CPC .... G06F 3/0608; G06F 3/0607; G06F 3/0631; G06F 3/0641; G06F 3/0647; G06F 3/0653; G06F 3/0683
See application file for complete search history.

(56) References Cited

U.S. PATENT DOCUMENTS

| 8,799,413 | B2 | 8/2014 | Taylor et al. |
| 8,849,955 | B2 | 9/2014 | Prahlad et al. |

(Continued)

OTHER PUBLICATIONS

X. Liu and B. Zhou, "DMS: A Dynamic Multi-tiered Storage with deduplication based on variable-sized chunks," 2017 6th International Conference on Computer Science and Network Technology (ICCSNT), 2017, pp. 127-131, doi: 10.1109/ICCSNT.2017.8343672. (Year: 2017).*

(Continued)

*Primary Examiner* — Khoa D Doan
(74) *Attorney, Agent, or Firm* — Hewlett Packard Enterprise Patent Department

(57) ABSTRACT

Example implementations relate to determining a storage utilization attributable to object data stored in deduplicated form. The storage utilization attributable to the object data may be determined from an amount of object data not shared with other objects of the deduplication store and a portion of an amount of object data shared with other objects of the deduplication store. It is determined whether the storage utilization results in exceeding a storage threshold of a storage tier to which the object data is assigned. Where the storage utilization is determined to exceed the storage threshold, the object data may be reassigned to a different storage tier, or data of another object may be removed from the storage tier.

20 Claims, 6 Drawing Sheets

(56) References Cited

U.S. PATENT DOCUMENTS

| | | | |
|---|---|---|---|
| 9,021,499 B2* | 4/2015 | Mopur | G06F 11/3433 |
| | | | 718/105 |
| 9,519,439 B2 | 12/2016 | Sundarrajan et al. | |
| 9,594,512 B1* | 3/2017 | Cao | G06F 3/0689 |
| 9,715,434 B1* | 7/2017 | Xu | G06F 11/1453 |
| 10,082,971 B1* | 9/2018 | Cao | G06F 3/0646 |
| 10,437,504 B1* | 10/2019 | Bao | G06F 3/0649 |
| 10,635,340 B2* | 4/2020 | Danilov | G06F 3/0653 |
| 2008/0228864 A1* | 9/2008 | Plamondon | G06F 16/9574 |
| | | | 709/203 |
| 2008/0228899 A1* | 9/2008 | Plamondon | H04L 67/2852 |
| | | | 709/219 |
| 2012/0260040 A1* | 10/2012 | Mallge | G06F 16/278 |
| | | | 711/117 |
| 2014/0136782 A1* | 5/2014 | Thomas | G06F 3/0664 |
| | | | 711/117 |
| 2015/0081994 A1 | 3/2015 | Christopher et al. | |
| 2015/0356134 A1* | 12/2015 | Hayasaka | G06F 16/2255 |
| | | | 707/692 |
| 2016/0078045 A1* | 3/2016 | Ebsen | G06F 16/1744 |
| | | | 707/693 |
| 2017/0010826 A1* | 1/2017 | Basham | G06F 3/0631 |
| 2018/0356989 A1 | 12/2018 | Meister et al. | |

OTHER PUBLICATIONS

Gali Kovacs, "Cloud Snapshot Costs: Amazon EBS Snapshots, Azure Snapshots, and Cloud Volumes ONTAP (formerly ONTAP Cloud)", Cloud Central, NetApp, available online at <https://cloud.netapp.com/blog/comparing-cloud-snapshot-costs-on-aws-and-azure>, May 3, 2018, 8 pages.

Kovas, G., "Cloud Snapshot Costs: Amazon EBS Snapshots, Azure Snapshots, and Cloud volumes ONTAP (formerly ONTAP Cloud)," May 3, 2018, https://cloud.netapp.com/blog/comparing-cloud-snapshot-costs-on-aws-and-azure.

Optimal Networks, Inc., "How Much Does Data Backup Cost for Small Business?," Mar. 31, 2015, https://resource.optimalnetworks.com/biog/2015/03/31/cost-data-backup-small-business.

Google Cloud, "Cloud Storage Pricing," Mar. 11, 2019, https://web.archive.org/web/20190315111803/https://cloud.google.com/storage/pricing.

* cited by examiner

COST-AWARE STORAGE ALLOCATION OF DEDUPLICATED OBJECTS

BACKGROUND

A client computing device, such as a host server or the like, may store data within primary storage. In some examples, the stored data may be backed up for redundancy and data protection purposes. In some examples, data may be backed up in deduplicated form such that the data is stored more compactly than on the primary storage. For instance, redundant data in a deduplication store may be replaced with a pointer to a unique instance of the data.

BRIEF DESCRIPTION OF THE DRAWINGS

Certain examples are described in the following detailed description and in reference to the drawings, in which.

DETAILED DESCRIPTION OF SPECIFIC EXAMPLES

As noted above, a computing device (such as a host, server, storage array, etc.) may back up data by storing the data in a system able to perform deduplication on the data (a "deduplication system" herein) in order to store the data in a more compact, deduplicated form.

In examples described herein, a process of deduplication performed by a deduplication system on a collection of data (referred to herein as a "stream" of data or a "data stream") may include dividing the stream into fixed or variable length sections of object data referred to herein as "blocks" (or "chunks"), identifying "duplicate" blocks having content identical to that of other blocks, storing one (full or compressed) copy of each block not identified as being a duplicate of an already-stored block and, for duplicate blocks, storing references (e.g., pointers) to the stored copy of the block without storing the same block again. In this manner, a deduplication process may often avoid storing duplicates of the same block in a deduplication store. In such examples, the deduplication system may store a deduplicated representation of objects, the deduplicated representation comprising selected data blocks and sufficient metadata to reconstruct the full version of objects from the selected data blocks and the metadata. With this approach, an object, a region of data that includes one or more data values, may be divided into blocks and stored within a deduplication store as will be described in greater detail below.

In examples described herein, a "block" may or may not correspond to a block format or size in which data is stored on a block storage device. For example, a data stream may be divided into fixed (e.g. 4K) or variable length sections whose boundaries do not correspond to the blocks (e.g. of 512K length) of a given block storage device.

Figure 1:
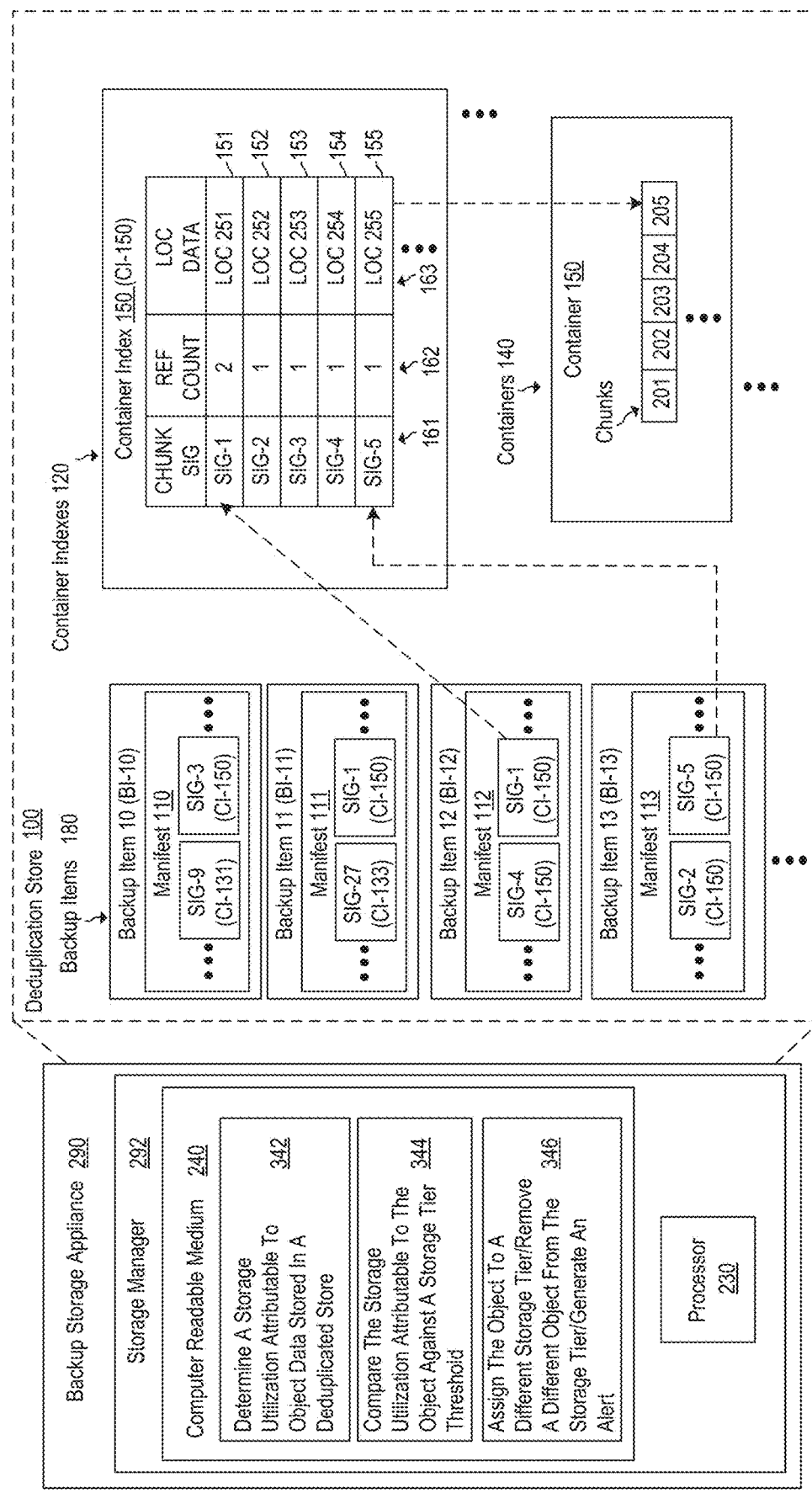
FIG. 1 is a block diagram of an example backup storage appliance.

FIG. 1 is a block diagram of an example backup storage appliance 290. Backup storage appliance 290 may store object backups in deduplicated form at deduplication store 100 of backup storage appliance 290. In examples described herein, a "deduplication store" may be a logical domain in which data may be stored in deduplicated form. Specifically, deduplication store 100 may store deduplicated representations of one or more streams of data using data structures including manifests, containers, and container indexes.

For example, deduplication store 100 may store backup items 180, illustrated as example backup items 10-13 respectively, in deduplication store 100 to represent data in deduplicated form. Represented data of a backup item, for example backup item 12, may be received in the form of a data stream. The data stream (and the backup item that represents it) may correspond to object(s) (e.g., file(s), a file system, volume(s), or any other suitable collection of data). The data stream may be divided into respective blocks of either a fixed size (e.g., approximately 4K) or a variable size and then, for each block, an appropriate signature function may be applied to the content of the block to obtain a block signature as a result for the block. In examples described herein, a "block signature" may be data representative of the content of a block derived by applying a signature function to the block. In some examples, the signature function may be a hash function, and the block signature may be a hash of the block generated by applying the hash function on the block. Any suitable hash function may be used to generate the block signature. In other examples, any other suitable type of signature function may be used in place of a hash function to generate an appropriate block signature (e.g., a function to generate a suitable type of fingerprint).

The block signature of each block derived from the block may be stored in a manifest, for example any of manifests 110-113 of respective backup items 10-13. Referring to backup item 12, the block signature of each block may be stored in manifest 112. The block signature for each block is used to determine whether a copy of that block is already stored in a container of deduplication store 100 (i.e., whether the block is a duplicate of an already stored block).

In examples described herein, a container may be a logical entity (e.g., a file, etc.) in which blocks of data may be stored (e.g., in a full or compressed form). Each container may have a corresponding container index, which is an index of the blocks contained in the corresponding container. A container index (e.g., 150) includes one or more entries (e.g., 151, 152, etc.), each entry including data for a respective block in the container (e.g., 150) corresponding to the container index (e.g., 150). Each entry includes the block signature of a respective block 161, a reference count 162 to indicate how many references to the block are made by the various manifests of the backup items 180 of deduplication store 100 (e.g., via the block signature for the block in the container index), and location data 163 specifying the location of the respective block in the corresponding container (e.g., via an offset and length, or the like.

To determine whether a copy of a given block is already stored in a container of deduplication store 100, the block signature for the given block may be compared against block signatures of at least one container index to find an identical block signature. For example, if an identical block signature (e.g., SIG-3) is found in an existing container index (e.g., 150), then the block signatures may be considered a match, and the given block may not be added to any of the containers, as it would be a duplicate of the block (e.g., 203)

corresponding to the identified identical block signature. Rather, the block signature for the given block (e.g., SIG-3) and an identifier of the container index including that block signature (e.g., CI-150) may be stored in manifest 112 to represent the copy of the given block that is already stored in a corresponding container (e.g., 150) at the location indicated by the location data in the container index.

However, if an identical block signature is not found for the chunk signature of the given block (e.g., because a copy of the given block is not currently stored in a container of deduplication store 100, or an identical block signature was not found in the particular container index(es) searched), then the given block is added to (e.g., stored in) a container of deduplication store 100 and a new entry is added to the container index corresponding to that container. In such examples, the added entry may include the block signature for the given block, location data for the block in the container to which it was added, and an initial reference count of 1 (since there will only be one reference to the corresponding block so far).

While storing data backups may, among other things, protect against data loss or corruption, the storage of data backups inevitably consumes storage resources. Intelligent data placement decisions of an object may be made corresponding to a relative "size" of the object. The size of the data object may be the relative amount of storage resources the object consumes, or, in other words, the amount of storage utilized by the object. As will be described in greater detail below, a size of a deduplicated object stored in a deduplication store may be determined, and the determined size may be utilized to place the object in an appropriate storage tier.

Backup storage appliance 290 may further include storage manager 292 for managing backup data stored at deduplication store 100. While backup storage manager 292 is illustrated as included within backup storage appliance 290, storage manager may, as will be described in further detail below, be a separate component in communication with backup storage appliance 290. Storage manager 292 may include a computer readable medium 240 including instructions, as further described below with respect to FIG. 3, to be executed by processor 230 for determining a storage utilization of objects 1-3.

Figure 2:
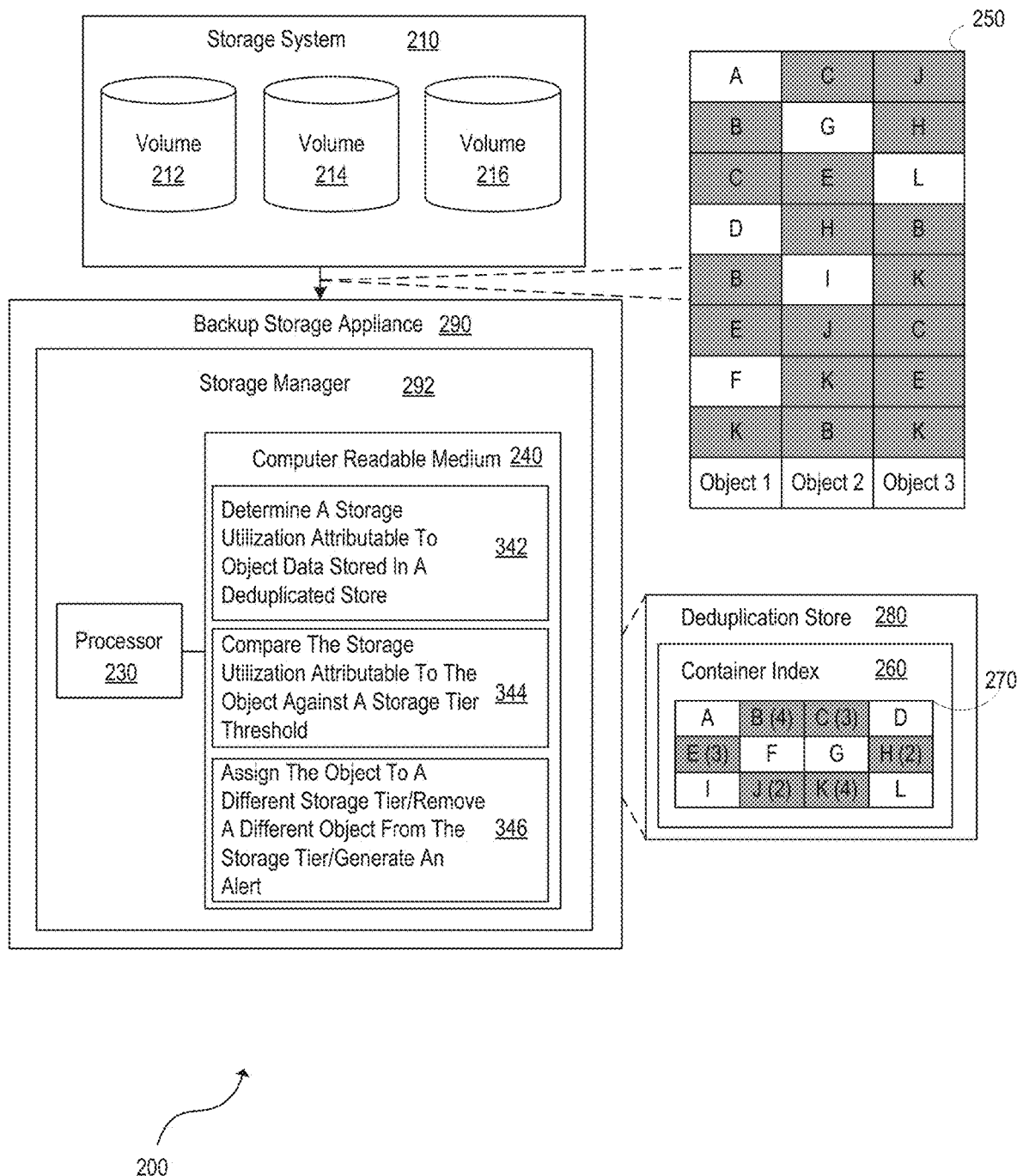
FIG. 2 is a block diagram illustrating an example system for determining the data utilization of a deduplicated object.

FIG. 2 is a block diagram illustrating an example system 200 for determining the data utilization of a deduplicated object. System 200 may include a storage system 210, such as a storage array, which may store storage volumes (e.g., volumes 212, 214, and 216, etc.) on one or more storage devices of storage system 210. In examples described herein, storage devices may be a non-volatile storage device, such as a solid-state drive (SSD), a hard disk drive (HDD), a storage class memory (SCM) device, or the like. Storage devices of storage system 210 may include SSD(s), HDD(s), SCM device(s), or the like, or any combination thereof. While three example storage volumes are illustrated for purposes of clarity and conciseness, a storage array may have any number of storage volumes. A storage volume is a logical unit of data storage that may be formatted to store data in the form of objects, directories, files, etc.

In this example, any of storage volumes 212-216 may include primary copies of example objects, Object 1, Object 2, and Object 3 respectively, illustrated within respective columns 250. Objects 1-3 are depicted in example FIG. 2 as being divided into multiple data blocks when stored at backup storage appliance 290. Each unique data block is indicated with a corresponding letter, such that like lettered data blocks include identical data as determined by deduplication store 100. In this illustrated example, each of objects 1-3, include an identical object block C. And, as illustrated in this example, each object may include multiple copies of a same object block. For example, object 1 may include two copies of object block B. For purposes of illustration, shaded data blocks within FIG. 2 are representative of shared data blocks, while unshaded data block within FIG. 2 are representative of unshared data blocks.

Original copies of the objects 1-3 may be stored at storage system 210. Deduplicated copies of objects 1-3 may be stored at backup storage appliance 290. Deduplication store 280 may include similar components to that deduplication store 100, including backup items 180, container indexes 120, and containers 140. However, for purposes of clarity and conciseness, those components are not replicated within example deduplication store 280.

Deduplication store 280 may include example container index 260, which may be a metadata index for a corresponding container that may be stored within deduplication store 280. Container index 260 may include a reference count for each block 270 in the corresponding container, which may include reference counts to object data of objects 1-3. The process by which data is deduplicated is described above with respect to FIG. 1. For purposes of this example, each data block is represented as either shared (shaded), or unshared (not shaded). A number of copies of a particular data block is depicted within container index 260 for each data block that is shared. For example, object B within container index 260 includes the number "4," indicating four copies of object B. The four copies are illustrated individually within primary copies 250, including two copies of object B within Object 1, one copy of object B within Object 2, and one copy of object B within Object 3. In this example, deduplication store 280 is illustrated within storage volume 216. However, in other example implementations, deduplication store 280 may be stored at storage volume 212, or a storage volume not local to storage device 210.

In this example implementation, backup storage appliance 270 may include storage manager 2292 Storage manager 292 may include a computer readable medium 240 including instructions, as further described below with respect to FIG. 3, to be executed by processor 230 for determining a storage utilization of objects 1-3. While storage manager 292 is illustrated as included within backup storage appliance 290, storage manager 292, as will be described in further detail below, may be included within storage system 210, or as a separate standalone component not illustrated.

Figure 3:
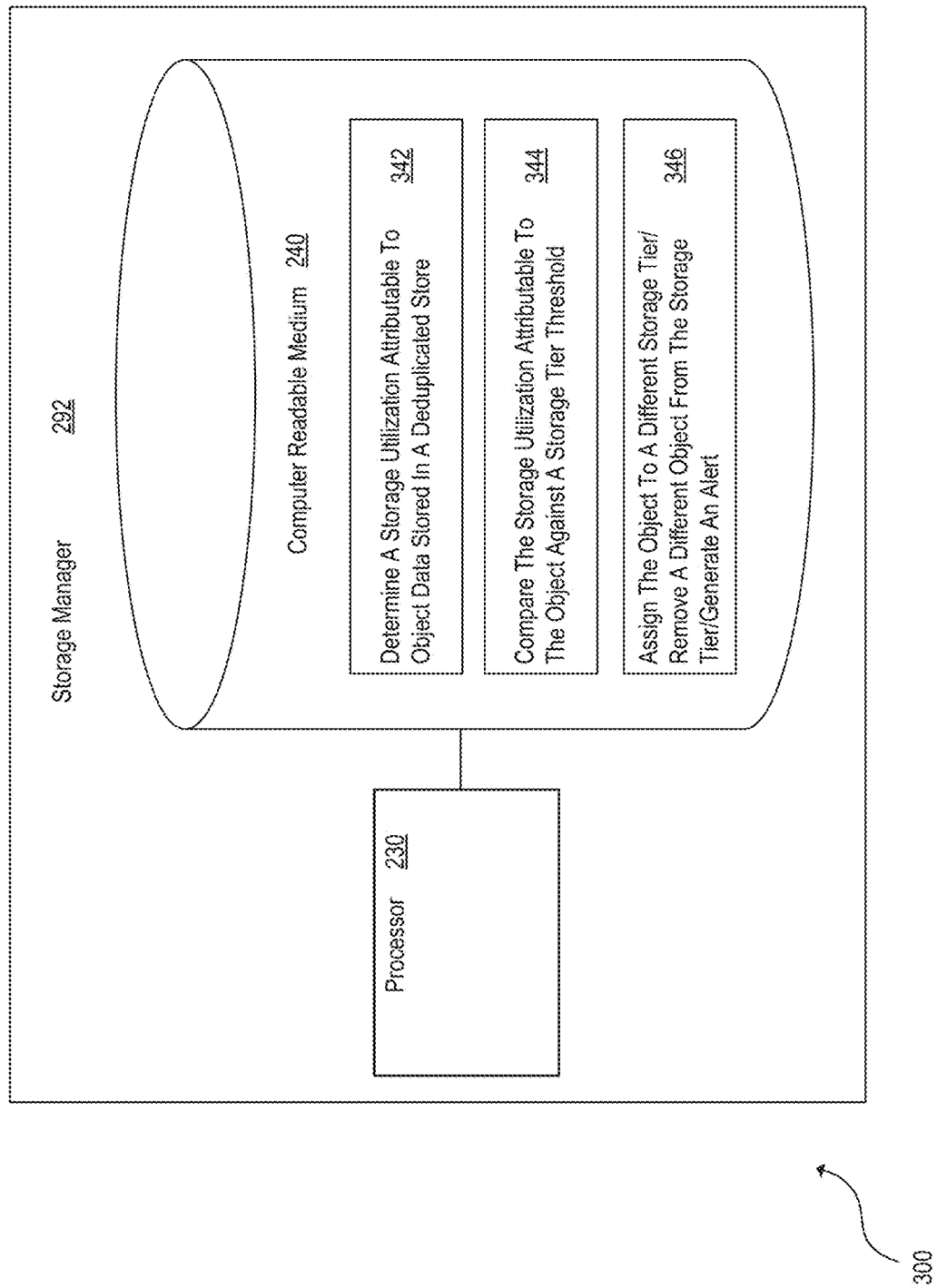
FIG. 3 is a block diagram illustrating an example storage manager for determining the data utilization of a deduplicated object.

FIG. 3 is a block diagram 300 illustrating the example storage manager 292 of FIG. 2. As illustrated in FIG. 3, storage manager 292 includes computer readable medium 240, and processor 230. Computer readable medium includes instructions 342-346 executable by processor 230, for assigning a object to a storage tier from a determined storage utilization of the object. Computer readable medium 240 of FIG. 3 may be coupled to processor 230.

Computer readable medium 240 may be implemented in a single device or distributed across devices. Likewise, processor 230 may represent any number of physical processors capable of executing instructions stored by computer readable medium 240. Further, storage manager 292 may be fully or partially integrated in a single device, e.g. storage device 210, or it may be implemented across multiple devices.

In one example, the instructions may be part of an installation package that when installed can be executed by processor 230. In this case, computer readable medium 240 may be a portable medium such as a floppy disk, CD, DVD, or flash drive or a memory maintained by a server from which the installation package can be downloaded and installed. In another example, the program instructions may be part of an application or applications already installed.

As used herein, a "computer readable medium" may be any electronic, magnetic, optical, or other physical storage apparatus to contain or store information such as executable instructions, data, and the like. For example, any computer readable medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer readable medium described herein may be non-transitory. In examples described herein, a computer readable medium or media may be part of an article (or article of manufacture). An article or article of manufacture may refer to any manufactured single component or multiple components.

Processor 230 may be a central processing unit (CPU), graphics processing unit (GPU), microprocessor, and/or other hardware device suitable for retrieval and execution of instructions stored in computer readable medium 240. Processor 230 may fetch, decode, and execute program instructions 342-346, and/or other instructions. Similarly, processor 230 may fetch, decode, and execute program instructions 342-346. As an alternative or in addition to retrieving and executing instructions, processor 230 may include at least one electronic circuit comprising a number of electronic components for performing the functionality of instructions 342-346, and/or other instructions. Similarly, processor 230 may include at least one electronic circuit comprising a number of electronic components for performing the functionality of instructions 342-346, and/or other instructions.

Computer readable medium 240 may include instructions 342, that, when executed, may cause processor 230 to determine a per-copy size of a deduplicated object. More specifically, instructions 342 may determine a storage utilization attributable to object data stored in a deduplication store, e.g. deduplication store 280. In an example, the storage utilization attributable to a object may be determined from both an amount of unshared object data of the object, i.e., an amount of object data of the object not shared with other object data stored within the deduplication store, and from a prorated portion of shared object data of the object, i.e., an amount of object data of the data object shared with other object data.

In an example implementation, instructions 342 may determine the attributable storage utilization from the following equation:

$$\text{Object Size} = U(x) + \sum_{i=1}^{n} S_i(x)/N_i(x)$$

where $U(x)$ is the total amount of unshared object data of the object, $S(x)$ is the amount of shared object data of the object, and $N(x)$ is the number of objects that share the shared block, such that $S(x)/N(x)$ is the prorated portion of shared object data of the object.

An example application of the equation above to calculate the per-copy size of an object may be illustrated with reference to FIG. 2. For instance, the per-copy size of Object 1 (OS) may be determined as follows:

$$OS_1 = S(A) + S(D) + S(F) + S\left(\frac{B}{4}\right) + S\left(\frac{C}{3}\right) + S\left(\frac{E}{3}\right) + S\left(\frac{K}{4}\right)$$

Assuming the size of each data block is 10, we can determine the per-copy size of Object 1 to be 44.16. Data blocks A, D, and F make up $U(x)$, because those data blocks in this example are unshared, whereas data blocks B, C, E, and K are prorated relative to the number of objects that share the shared block.

The per-copy size of Object 2 and Object 3 may also be determined in like manner:

$$OS_2 = S(G) + S(I) + S\left(\frac{C}{3}\right) + S\left(\frac{E}{3}\right) + S\left(\frac{H}{2}\right) + S\left(\frac{J}{2}\right) + S\left(\frac{K}{4}\right) + S\left(\frac{B}{4}\right)$$

$$OS_3 = S(L) + S\left(\frac{J}{2}\right) + S\left(\frac{H}{2}\right) + S\left(\frac{B}{4}\right) + S\left(\frac{K}{4}\right) + S\left(\frac{C}{3}\right) + S\left(\frac{E}{3}\right) + S\left(\frac{K}{4}\right)$$

Assuming once again a the size of each data block is 10, we can determine the per-copy size of Object 2 to be 41.66 and the per-copy size of Object 3 to be 34.16.

While only a few object blocks A-K are described above in the illustrated example, an object may contain any number of object blocks, and different objects may contain different number of object blocks. In some examples, objects may contain large number of data blocks, and may, in some instances, total in the order of billions of data blocks. In examples with large numbers of data blocks, calculating the size of each data block may be computationally intensive. To save on computational resources, the size of an object may approximated with the following more computationally efficient equation:

$$\text{Object Size} \approx U(x) + DS(x)*(Tu - \Sigma_{i=1}^{n} U(x)/\Sigma_{i=1}^{n} DS(x))$$

where $U(x)$ is the amount of unshared object data on the disk, $DS(x)$ is the deduplicated data of the object, and Tu is the size of the disk store.

An example application of the approximation equation above to calculate the per-copy size of an object may be illustrated with reference to FIG. 2. For instance, assuming each data block is of a size 10, the per-copy size of Object 1 (OS) may be approximated as follows:

$$OS_1 \approx 30 + \left(50 * \frac{120 - 60}{180}\right) = 46.66$$

Here, the value 30 is determined from to sum of the unshared data blocks A, D, and F. The value 50 is determined from the deduplicated data of the object, i.e., the shared data blocks of Object 1, B, C, B, E, and K. The value 120 is determined from the size of the deduplication store, e.g. deduplication store 280. The value 60 is determined from the amount of unshared data within the deduplication store, i.e. the unshared data blocks A, D, F, G, I, and L. The value 180 is determined from the amount of shared data within the deduplication store, i.e., 4B+3C+3E+2J+4K+2H. The same approximation can be applied to Object 2 and Object 3, yielding the determined sizes 40 and 33.33 respectively.

From the per-copy sizes of each object, a respective "cost" of the objects may be determined. For instance, a total effective space usage for a volume, e.g. volume 216, may be determined from the sum of each object per-copy size. In an example implementation, storage volume 216 may be divided into any number of storage tiers, and the total effective space usage may be the amount of space utilized at a particular storage tier of volume 216. From the example above, we can determine the total effective space usage for volume 216 to be 44.16+41.66+34.16=119.98 and, using the approximation equation, to be 46.66+40+33.33=119.99. While no units are provided for the values indicated above, it may be understood that any measure of data size may be applicable, e.g. gigabytes, bits, etc.

The total space consumed by each copy may be determined from the determined total effective space usage for the volume, multiplied by the Redundant Array of Independent Disks (RAID) level. RAID is data storage virtualization technology that increases data redundancy through the combination of physical disk drive components into a cohesive logical unit. The distribution of data across these disk drives is determined by the RAID level, and the RAID level is correlated with the total space consumed by each data copy. The "cost" of each data copy may thus be determined from the total space consumed by each data copy multiplied by the rate of cost to storage resources.

In some examples, this determined cost may be reported on a user interface, which may displayed any number of cost insights, such as the storage cost of a particular virtual machine, database, volume, storage tier, or any other discrete storage medium. In some example implementations, the determined cost may be categorized by age. For example, a total cost of data whose age is less than and/or greater than an amount of time may be reported.

The cost of objects at a particular storage tier may be determined. Instructions 344, when executed by processor 230, may compare the determined storage utilization attributable to the object, e.g. the size of an object, the cost of the object, etc., to a storage tier threshold to which the object is assigned. For example, a storage tier threshold may be set to 100. Using the example provided above, we can determine that the total effective space usage for volume 216 storing data blocks for objects 1-3 is ~120, and this determined value may be compared to the storage tier threshold 100.

Instructions 346, when executed by processor 230, may take a remedial action to ensure that the storage tier does not exceed the storage tier threshold. In an example implementations, instructions 346 may generate an alert, e.g. via a user interface, to indicate that a storage tier threshold has been determined to be exceeded. In another example implementation, an object may be assigned to a different storage tier responsive to a determination that a total effective space usage exceeds the storage tier threshold. For example, referring to FIG. 2, Object 1 may be created and/or assigned to a same storage tier threshold as Object 2 and Object 3. Responsive to this creation and/or assignment, the storage utilization attributable to Object 1 may be determined, as well as the total effective space usage for the storage tier including Object 1. With reference to the example above, the total effective space usage of the storage tier, e.g. ~120, may be determined to be greater than the predetermined storage tier threshold 100. Responsive to this determination, Object 1 may be assigned to a different storage tier. In another example implementation, Object 2 and/or Object 3 may be reassigned to a different storage tier. In an example implementation, Object 1 may be assigned to the storage tier responsive to a determination that a total effective space usage of the storage tier, including the effective space usage of Object 1, would not exceed the storage tier threshold Thus, storage manager 292 may take preventative and/or remedial measures to ensure that a storage tier does not exceed a predetermined storage tier threshold.

Figure 4:
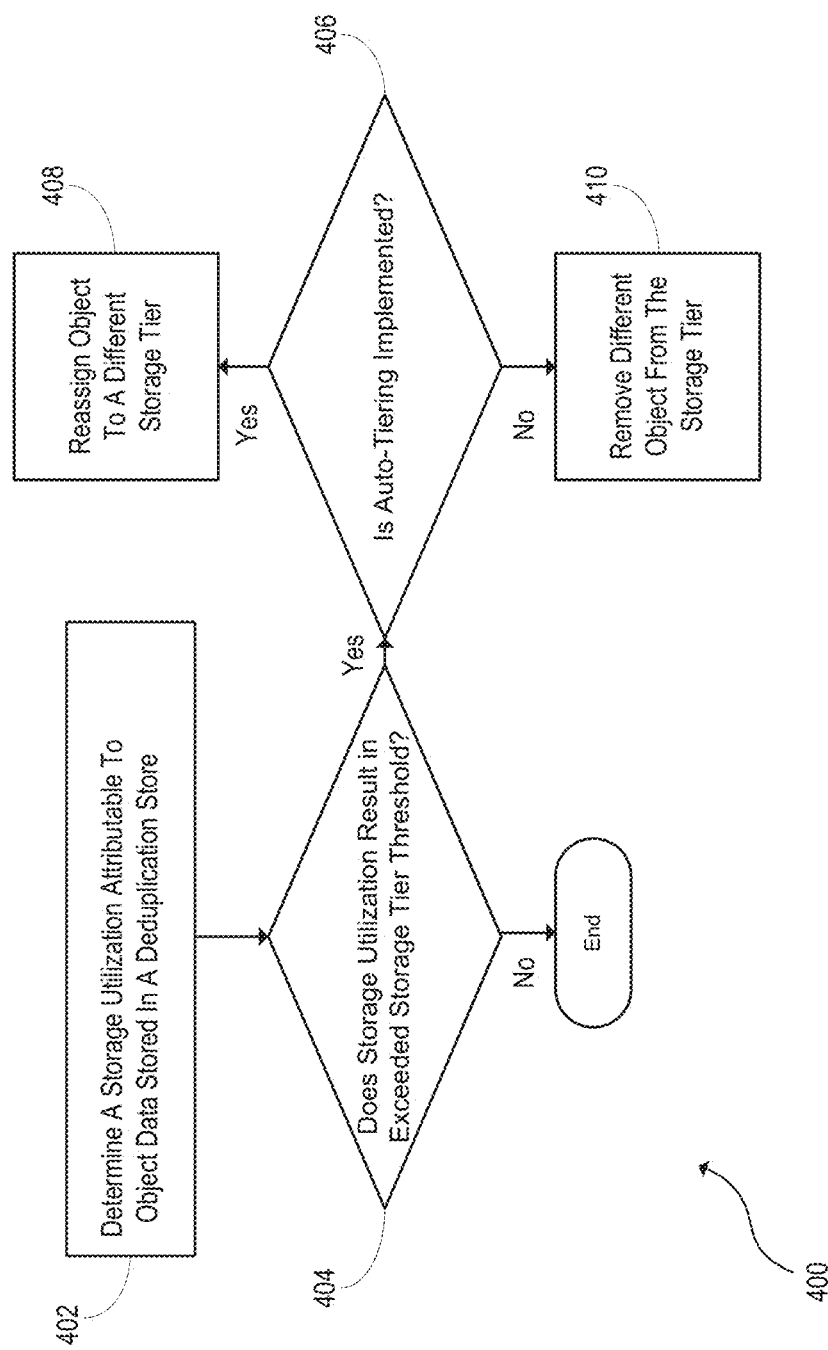
FIG. 4 is a flowchart illustrating an example method for object copy tier migration.
Figure 5:
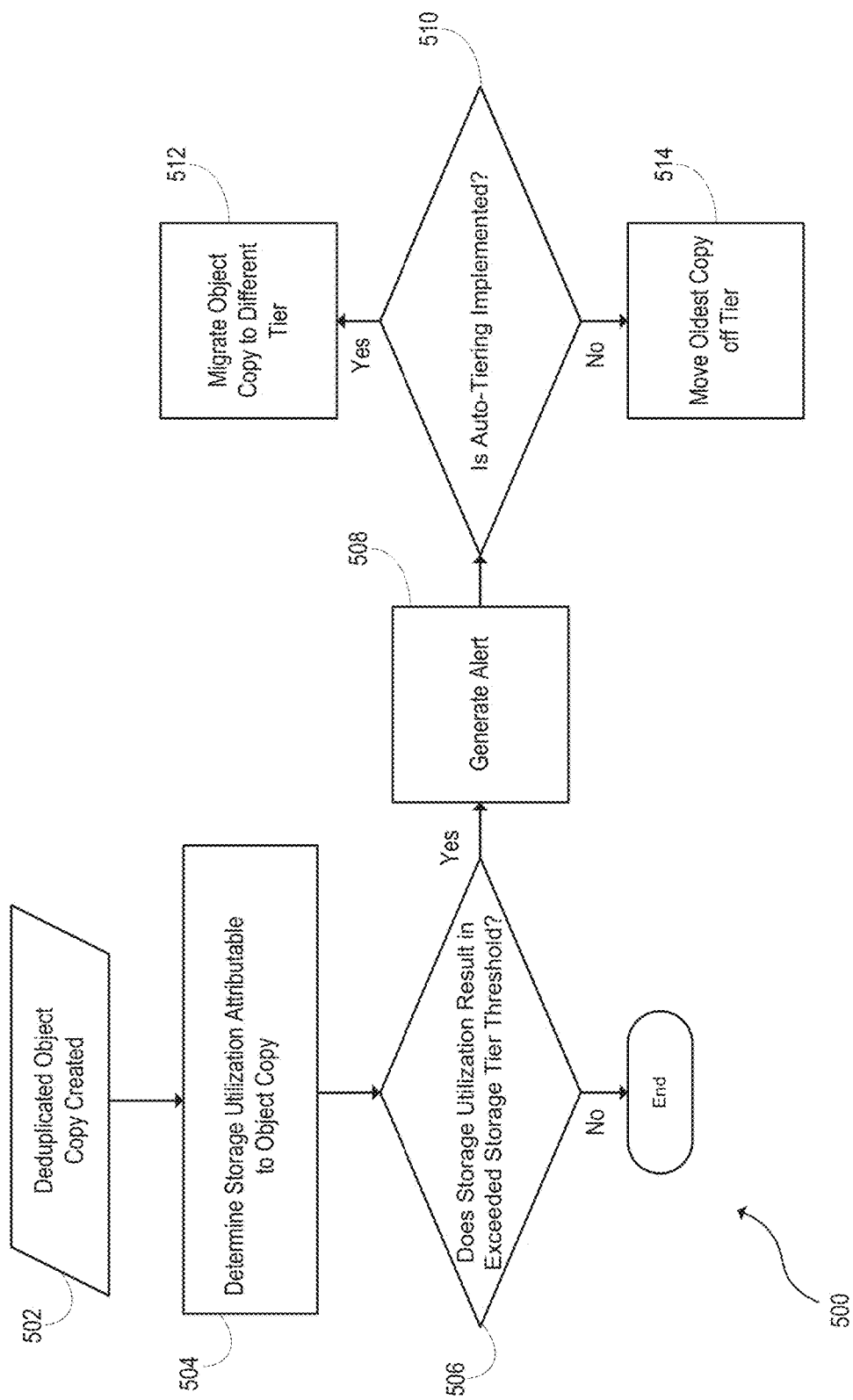
FIG. 5 is another flowchart illustrating an example method for object copy tier migration.

FIG. 4 and FIG. 5 are flowcharts, 400 and 500 respectively, illustrating a method for object copy tier migration. Although execution of method 400 and 500 are described below with reference to system 200, this is for explanatory purposes and other suitable components for execution of method 400 and method 500 may be utilized. Additionally, the components for executing method 400 and 500 may spread among multiple devices. Method 400 and method 500 may be implemented in the form of executable instructions stored on a machine-readable storage medium and/or in the form of electronic circuitry, e.g. hardware. In some examples, steps of method 400 and method 500 may be executed substantially concurrently or in a different order than shown in FIG. 4 and FIG. 5. In some examples, method 400 and 500 may include more or less steps than are shown in FIG. 4 and FIG. 5. In some examples, some of the steps of method 400 and 500 may, at certain times, be ongoing and/or may repeat.

At block 402, a storage utilization attributable to object data stored in a deduplicated store may be determined. In an example implementation, the storage utilization attributable to the object data may be determined from a total size of data stored on the deduplicated store. In another example, the storage utilization attributable to the object data may be a total size of unshared data on the deduplicated store, and/or a total size of shared data on the de-duplicate store. For example, the storage attributable to the object data may be a total size of data stored on deduplication store 280 of FIG. 2, a total size of unshared data on deduplicated store 280, and/or a total size of shared data on deduplicated store 280. Examples of determining the storage utilization attributable to object data stored in a deduplicated store are further described above with respect to instructions 342 of FIG. 3.

At block 404, it may be determined whether a storage utilization exceeds a storage tier threshold of a storage tier. For example, Object 1 of FIG. 2, along with Object 2 and Object 3, may be assigned to a storage tier within deduplication store 280. It may be determined at block 404 for example, whether the assignment of Object 1 to the storage tier at deduplication store 280 results in a storage utilization of the storage tier exceeding a storage tier threshold of the storage tier.

Responsive to a positive determination at block 404, it may be determined whether an auto-tiering scheme is implemented at block 406. In an example, the implementation of an auto-tiering scheme may enable reassignment of a created object copy to a storage tier, different from the storage tier to which the object copy was originally assigned in response to a policy or triggered condition. At block 408 for example, it may be determined that an auto-tiering scheme is implemented. Responsive to that determination, an object that would otherwise exceed a storage tier assignment due to its assignment to the storage tier may be moved, at block 408, to a more or less expensive storage tier. For instance, the assignment of example Object 1 to a storage tier of deduplication store 280 may result in a determination that the storage utilization of the storage tier would exceed a storage tier threshold. An implemented auto-tiering scheme, responsive to that determination, may reassign Object 1 to a different storage tier.

Conversely, it may be determined at block 406 that an auto-tiering scheme is not implemented. In this instance, an object already stored at the storage tier may be removed from the storage tier at block 410. For example, the assignment of example Object 1 to the storage tier may result in a determination that the storage utilization of the storage tier would exceed a storage tier threshold, and, responsive to that determination, a different object, e.g. object 2, and/or object 3, may be removed from the storage tier. In an example implementation, an oldest copy of Object 1 may be removed from the storage tier at block 410. However, in other example implementations, other criteria may be utilized to determine the object to be removed from the storage tier. Accordingly, preventative and/or remedial measures are implemented to ensure that that a storage utilization of a storage tier does not exceed a threshold of the storage tier.

Turning to FIG. 5, flowchart 500 may include similar blocks to that of FIG. 4 as will be described below. At block 502, a deduplicated object copy may be created. The created object copy, may, for example, be assigned to a storage tier. For example, Object 1 of FIG. 2 may be assigned to a storage tier of deduplication store 280. At block 504, a storage utilization attributable to the created object copy may be determined, as described above with reference to block 402.

At block 506, the determined storage utilization may be determined to exceed a storage tier threshold, as described above with respect to block 404 of FIG. 4. Responsive to a determination at block 506 that the storage utilization exceeds the storage tier threshold, an alert may be generated at block 508. For example, a sound and/or message may be displayed on a user interface prompting a user, such as an IT administrator, to take remedial action responsive to the determination. In another example implementation, automated remedial and/or preventative measures may be implemented. For example, at block 510, it may be determined whether an auto-tiering scheme is implemented, as described with reference to block 406 of FIG. 4.

Responsive to a positive determination at block 510, an object may be migrated to a different storage tier at block 512, as described with reference to block 408 of FIG. 4. Responsive to a negative determination at block 510, an oldest copy of the created object may be removed from the storage tier at block 514 as described above with reference to block 410 of FIG. 4.

Figure 6:
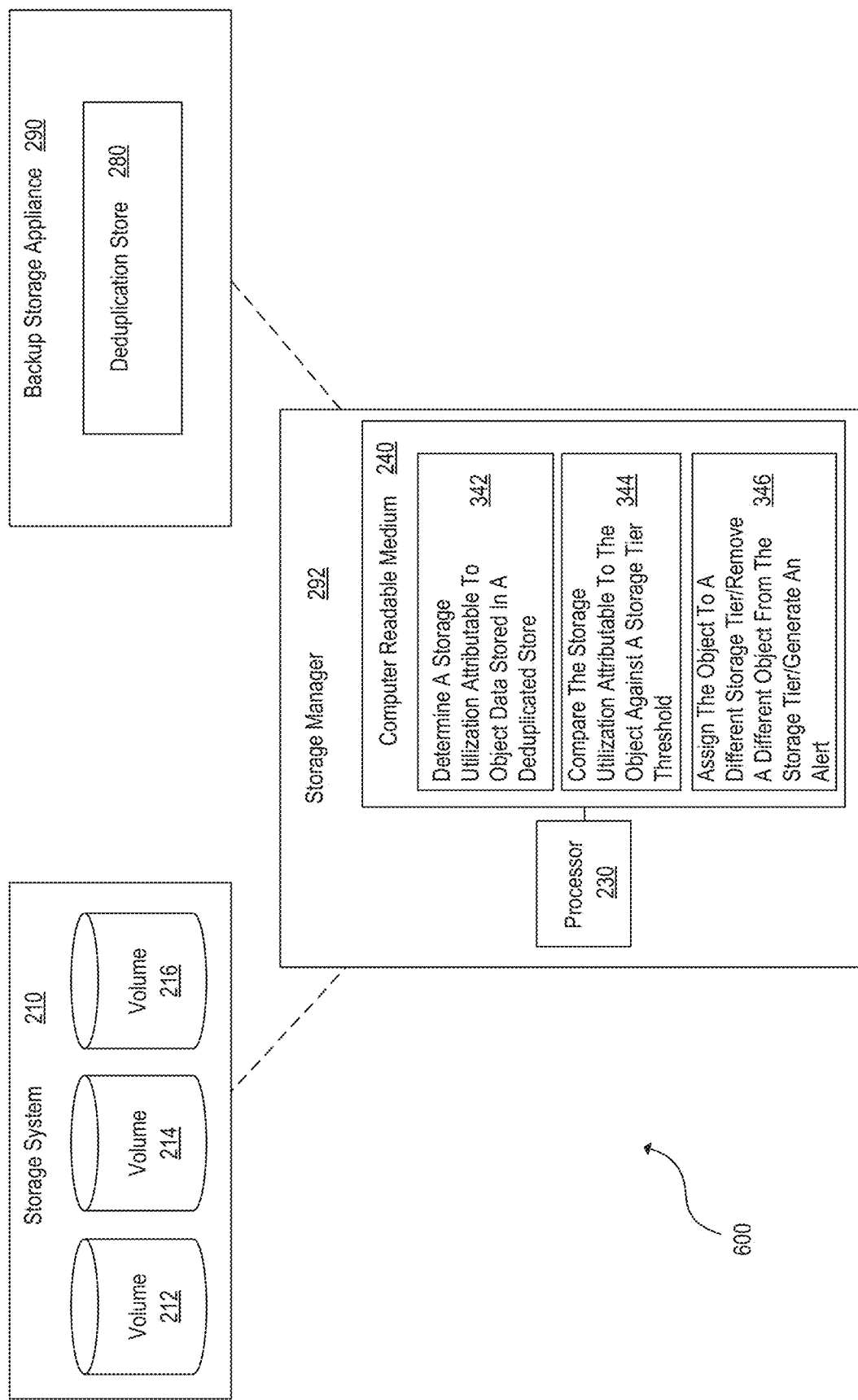
FIG. 6 is a block diagram illustrating an example system for determining the data utilization of a deduplicated object.

FIG. 6 is a block diagram illustrating an example system 600 for determining the data utilization of a deduplicated object. FIG. 6 may include similar architecture to example system 200. For example, FIG. 6, may include storage manager 292, including processor 230 and computer readable medium 240 of system 200. FIG. 6 may additionally include storage system 210 of system 200 having storage volumes 212-216 and backup storage appliance 290 having deduplication store 280. Unlike example system 200, system 600 illustrates storage manager 292 as remote from backup storage appliance 290. Storage manager 292 may further be in communication with, and otherwise manage multiple storage devices, which may or may not be at a common physical location, data center, region, etc.

In an example implementation, storage manager 292 may migrate object copies from a first storage volume, e.g. storage volume 216, to a second storage volume according to an auto-tiering scheme. For example, as described at block 408 of FIG. 4 with respect to reassigning objects, an object may be reassigned to a different storage volume responsive to a determination that the storage utilization results in exceeding a storage tier threshold, or, in some example implementations, a storage utilization threshold of a storage volume.

In an example implementation, storage manager 292 may migrate object copies across storage systems responsive to an auto-tiering scheme. In an example, an oldest copy of an object at storage volume 216 of storage system 210 may be moved off of storage system 210 responsive to a determination that volume 216 has exceeded a storage utilization threshold.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method to be executed by a processor, the method comprising:
    determining a storage utilization attributable to data of a given object stored in deduplicated form in a deduplication store, based on:
        an amount of the data of the given object not shared with any other object of the deduplication store, and
        an amount of the data of the given object shared with at least one other object of the deduplication store;
    determining whether a storage tier threshold of a storage tier to which the given object is assigned is exceeded based at least in part on the determined storage utilization; and
    when the storage tier threshold is exceeded based at least in part on the determined storage utilization:
        reassigning the object to a different storage tier; or
        removing data of another object from the storage tier.

2. The method of claim 1, wherein the object data is an object copy, and the storage utilization is determined responsive to a creation of the object copy.

3. The method of claim 1, wherein the object data is reassigned to a different storage tier responsive to the storage utilization resulting in exceeding the storage tier threshold.

4. The method of claim 1, wherein the data of another object is removed from the storage tier responsive to the storage utilization resulting in exceeding the storage tier threshold.

5. The method of claim 1 wherein the amount of data of the given object shared with at least one other object is a prorated amount.

6. The method of claim 1, wherein the object data is a copy of an object, and the data of another object is an oldest copy of the object within the storage tier.

7. The method of claim 1, wherein the storage utilization attributable to the object data is further determined from at least one of,
    a total size of data stored on the deduplicated store;
    a total size of unshared data on the deduplicated store; and
    a total size of shared data on the deduplicated store.

8. The method of claim 7, wherein the storage utilization attributable to the object data is determined from a calculated approximation according to the following formula:

$$\text{Storage Utilization of Object} = [U(x) + (DS(x)*((TU - \Sigma_{i=1}^{n} U(x))/\Sigma_{i=1}^{n} DS(x)))],$$

where $U(x)$ is the amount of unshared data of the object data, $DS(x)$ is object data shared with other objects on the deduplicated store, $TU$ is the total size of data stored on the deduplicated store, $\Sigma_{i=1}^{n} U(x)$ is the total size of unshared data on the deduplicated store, and $\Sigma_{i=1}^{n} DS(x)$ is the total size of shared data on the deduplicated store.

9. The method of claim 1, wherein the storage utilization attributable to the object data is determined from the following formula:

$$\text{Storage Utilization of Object} = [U(x) + \Sigma_{i=1}^{n} S_i(x)/N_i(x)],$$

where $U(x)$ is an amount of unshared data of the object, $S_i(x)$ is the amount of space occupied by a shared block i, and $N_i(x)$ is a number of objects using a shared block i.

10. A non-transitory computer readable medium comprising instructions executable by a processor to:
   determine a storage utilization attributable to object data stored in a deduplicated store, wherein the storage utilization is calculated from
      an amount of object data not shared with other objects of the deduplication store, and
      a portion of data of the object shared with other object data of the deduplicated store;
   compare the storage utilization attributable to the object data against a storage tier threshold; and
   responsive to the determined storage utilization exceeding the storage tier threshold,
      assign the object data to a different storage tier;
      remove data of another object from the storage tier; or
      generate an alert.

11. The non-transitory computer readable medium of claim 10, wherein the object data is an object copy, and the storage utilization is determined responsive to a creation of the object copy.

12. The non-transitory computer readable medium of claim 10, further comprising assigning the object data to the storage tier responsive to the determined storage utilization not exceeding the storage tier threshold.

13. The non-transitory computer readable medium of claim 10, wherein the object data is reassigned to a different storage tier responsive to the determined storage utilization exceeding the storage tier threshold.

14. The non-transitory computer readable medium of claim 10, wherein the data of the other object is removed from the storage tier responsive to the determined storage utilization exceeding the storage tier threshold.

15. The non-transitory computer readable medium of claim 12, wherein the storage utilization attributable to the object data is determined from a calculated approximation according to the following formula:

Storage Utilization of Object=$[U(x)+(DS(x)*((TU-\Sigma_{i=1}^{n}U(x))/\Sigma_{i=1}^{n}DS(x)))]$, where $U(x)$ is the amount of unshared object data, $DS(x)$ is object data shared with other objects on the deduplicated store, $TU$ is a total size of data stored on the deduplicated store, $\Sigma_{i=1}^{n}(x)$ is a total size of unshared data on the deduplicated store, and $\Sigma_{i=1}^{n}(x)$ is a total size of shared data on the deduplicated store.

16. The non-transitory computer readable medium of claim 12, wherein the storage utilization attributable to the object data is determined from the following formula:

Storage Utilization of Object=$[U(x)+\Sigma_{i=1}^{n}S_i(x)/N_i(x)]$, where $U(x)$ is an amount of unshared object data, $S_i(x)$ is the amount of space occupied by a shared block i, and $N_i(x)$ is a number of objects using a shared block i.

17. A system comprising:
   a processor; and
   a non-transitory computer readable storage medium storing instructions that, when executed by a processor, cause the processor to:
      determine a storage utilization attributable to deduplicated object blocks of a first object, the object blocks assigned to a first storage tier of a data storage medium, wherein the storage utilization is determined from,
         deduplicated object blocks of the first object not shared with other objects of a deduplication store, and
         a prorated portion of an amount of deduplicated object blocks of the first object shared with other objects of the deduplicated store;
      compare the determined storage utilization against a storage tier threshold of the first storage tier; and
      responsive to the determined storage utilization exceeding the storage tier threshold,
         reassigning the first object to a second storage tier of the data storage medium; or
         removing a second object from the first storage tier.

18. The system of claim 17, wherein the deduplicated object blocks are stored in a container.

19. The system of claim 17, further comprising a storage device on which the non-transitory computer readable storage medium and the deduplicated store is stored.

20. The system of claim 17, wherein the non-transitory computer readable medium is included at a centralized device manager at which a device including the data storage medium is registered.

* * * * *